United States Patent [19]

Hayakawa

[11] Patent Number: 5,075,519

[45] Date of Patent: Dec. 24, 1991

[54] WINDSHIELD WIPER SWITCH

[75] Inventor: Hiroshi Hayakawa, Furukawa, Japan

[73] Assignee: Alps Electric Co., Ltd., Tokyo, Japan

[21] Appl. No.: 550,938

[22] Filed: Jul. 11, 1990

[30] Foreign Application Priority Data

Oct. 31, 1989 [JP] Japan ............................. 1-126696[U]

[51] Int. Cl.$^5$ ...................... H01H 9/00; H01H 21/00; H01H 25/04

[52] U.S. Cl. .................................... 200/61.54; 200/4; 200/61.27

[58] Field of Search ................. 200/4.5 R, 61.54, 523, 200/529, 51.03, 61.27

[56] References Cited

U.S. PATENT DOCUMENTS

| | | | |
|---|---|---|---|
| 2,993,098 | 7/1961 | Canaday | 200/51.03 X |
| 4,321,437 | 3/1982 | Cryer | 200/61.54 |
| 4,387,279 | 6/1983 | Brevick | 200/61.54 |
| 4,599,501 | 7/1986 | Migrin | 200/529 |
| 4,812,603 | 3/1989 | Coleman | 200/529 |

Primary Examiner—J. R. Scott
Attorney, Agent, or Firm—Guy W. Shoup; David W. Heid

[57] ABSTRACT

A windshield wiper switch which comprises a push switch portion for controlling the spouting of windshield washer liquid by operating a push knob, a rotary switch portion for operating a windshield wiper at a plurality of rates, depending upon positions to which a rotor is rotated, and an adjusting system for positioning the rotor in the positions. Cams are provided in the push knob and the rotor, respectively, and when the push knob is pushed to operate while the position of the rotor is in a STOP position, the cams come into contact with each other so as to rotate the rotor in a LO position. Further, projected stoppers for preventing the rotor from rotating further are provided in the push knob and the rotor, respectively.

1 Claim, 4 Drawing Sheets

WINDSHIELD WIPER SWITCH

BACKGROUND OF THE INVENTION

1. Field of the Invention

The present invention relates to a windshield wiper switch, and more particularly to a windshield wiper switch which permits switching for wiper operations as well as spouting of windshield washer liquid.

2. Description of the Related Art

An automobile is equipped with a windshield wiper to wipe waterdrops and to remove dirt from the windshield when it is raining.

Generally, the windshield wiper is so constructed as to perform switching for a plurality of wiping operations as well as spouting of windshield washer liquid.

FIG. 7 is a perspective view showing a conventional windshield wiper switch. A rotary switch 2 and a push switch 3 are arranged in a sleeve 1. The rotation of a knob 4, rotatably attached to the sleeve 1, in directions indicated by an arrow θ makes it possible for the rotary switch 2 to be turned to either of the following positions: a HI (high speed) position, an LO (low speed) position, an OFF (halt) position and a MIST position (operative while the knob 4 is in operation). An adjusting system maintains these positions.

Further, the press of the push button 5, associated with a push switch 3, in the direction indicated by an arrow Y turns a connection ON, thereby allowing windshield washer liquid to spout.

According to a windshield wiper switch as constructed above, the switching of operations for the rotary switch 2 makes it possible for the windshield wiper to reciprocate at a high or low rate for removing waterdrops. The windshield wiper also reciprocates to remove waterdrops while the knob 4 is in operation. In addition, windshield washer liquid is spouted by pushing the push button 5 during the above reciprocating motion to wash the windshield.

In most cases, while the windshield is being washed with spouted windshield washer liquid, the windshield wiper needs to be operating.

Hence, the type of windshield wiper switch as described above is so constructed that when a driver pushes the push button 5 to spout windshield washer liquid while the rotary switch 2 remains in the OFF position, a cam system 19 interposed between the rotary switch 2 and the push switch 3 shifts the rotary switch 2 to the LO position. In other words, the windshield wiper switch is so designed that even when the driver pushes the push button 5 without first shifting the rotary switch 2 to the LO position, the windshield wiper is interlocked by the cam system 19 with the push button 5 to shift to a low rate for spouting windshield washer liquid.

According to the conventional art, the push button 5 needs to be pushed strongly, since the rotary switch 2 is actuated with the aid of the cam system 19. If a driver, however, pushes the push button 5 too strongly, then the rotary switch 2 may be switched over to the HI position, without stopping in the LO position. This phenomenon is undesirable in terms of windshield washing.

SUMMARY OF THE INVENTION

It is an object of the present invention to overcome the above-mentioned problem, and to provide a windshield wiper switch which is so constructed that when a push button is actuated while a rotary switch remains in the OFF position, the rotary switch is always set to a predetermined switch position in order to drive a windshield wiper at an appropriate rate for washing, thus allowing windshield washer liquid to spout.

In order to achieve the aforesaid object, according to the present invention, a windshield wiper switch comprising a push switch portion for controlling the spouting motion of windshield washer liquid by operating a push button knob, a rotary switch portion for operating a windshield wiper at a plurality of rates, depending upon positions to which a rotor is rotated, and an adjusting system for positioning the rotor in the positions, cams being provided in the push button knob and the rotor, respectively, and when the push button knob is pushed to operate while the position of the rotor is in a STOP position, the cams come into contact with each other so as to rotate the rotor in a LO position, wherein projected stoppers for preventing the rotor from rotating further are provided in the push button knob and the rotor, respectively.

According to the present invention, when the push button of the push switch portion is pushed while the rotary switch portion remains in the OFF position, the rotor of the rotary switch portion is interlocked by means of a cam system with the actuation of the push knob associated with the push switch portion in order to rotate in a predetermined rotation position.

A stopper interposed between the rotor and the push knob stops the rotor in the predetermined rotation position.

Other features and advantages of the present invention will become apparent from the following Description of the Preferred Embodiment when read with reference to the attached drawings.

DESCRIPTION OF THE PREFERRED EMBODIMENT

An embodiment of the present invention will be explained hereinafter with reference to the accompanying drawings.

Figure 1:
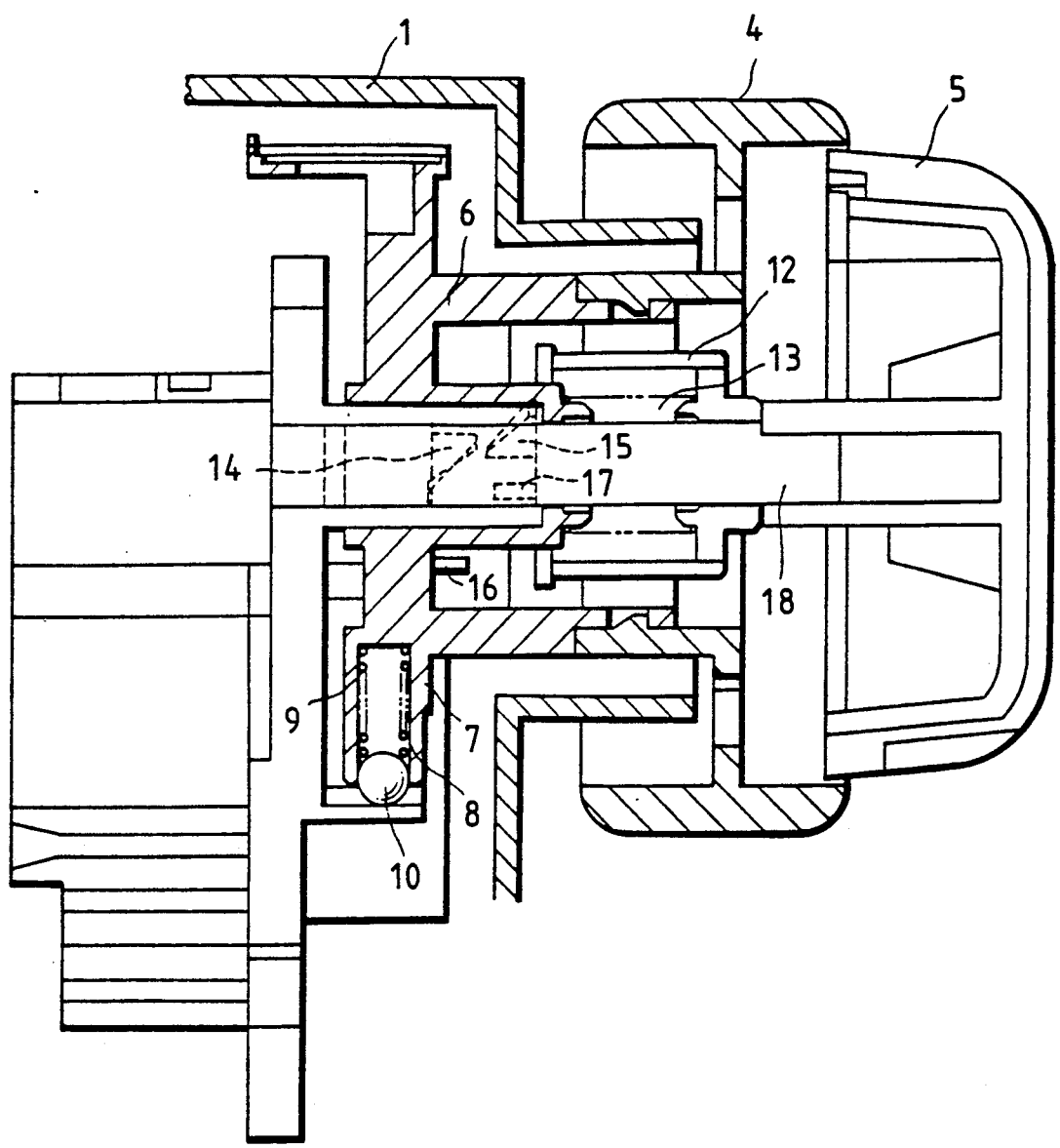
FIG. 1 is a cross-sectional view showing a windshield wiper switch according to the present invention.

FIG. 1 is a cross-sectional view showing a windshield wiper switch according to the present invention. A push switch portion and a rotary switch portion are coaxially arranged in the windshield wiper switch, respectively. Inside a sleeve 1 is attached a rotor 6 of the rotary switch portion with its one end protruding outside. A receiving portion 7 is formed to protrude on the periphery of the rotor 6, and a ball 10 which is energized outwardly by a spring 9 is housed in a concavity 8 of the receiving portion 7.

Windshield wiper connection patterns (not shown) corresponding to HI, LO, MIST positions and the like are formed so as to oppose a sliding portion (not shown) mounted on the rotor 6 on the wafer of the rotary switch portion in the sleeve 1. A plurality of cam ridges 11 are formed on the wafer, and the ball 10 is pressed against these cam ridges 11 to roll. The spring 9, the ball 10 and the cam ridges 11 compose an adjusting system.

A knob 4 is affixed to a portion projecting from the sleeve 1 associated with the rotor 6, and the rotor 6 rotates accordingly together with the rotation of the knob 4.

An operating shaft 18 of the push switch portion is movably disposed in the axial direction of the rotor 6. A slider 12 is slidably attached to the operating shaft 18, and also a push button 5 in contact with the slider 12 is affixed to the operating shaft 18 A spring 13 is arranged between both the edges of the slider 12 and the rotor 6. Therefore, when the push button 5 is pushed, the operating shaft 18 is pushed and at the same time the slider 12 is pushed against the reaction exerted by the spring 13.

Figure 6:
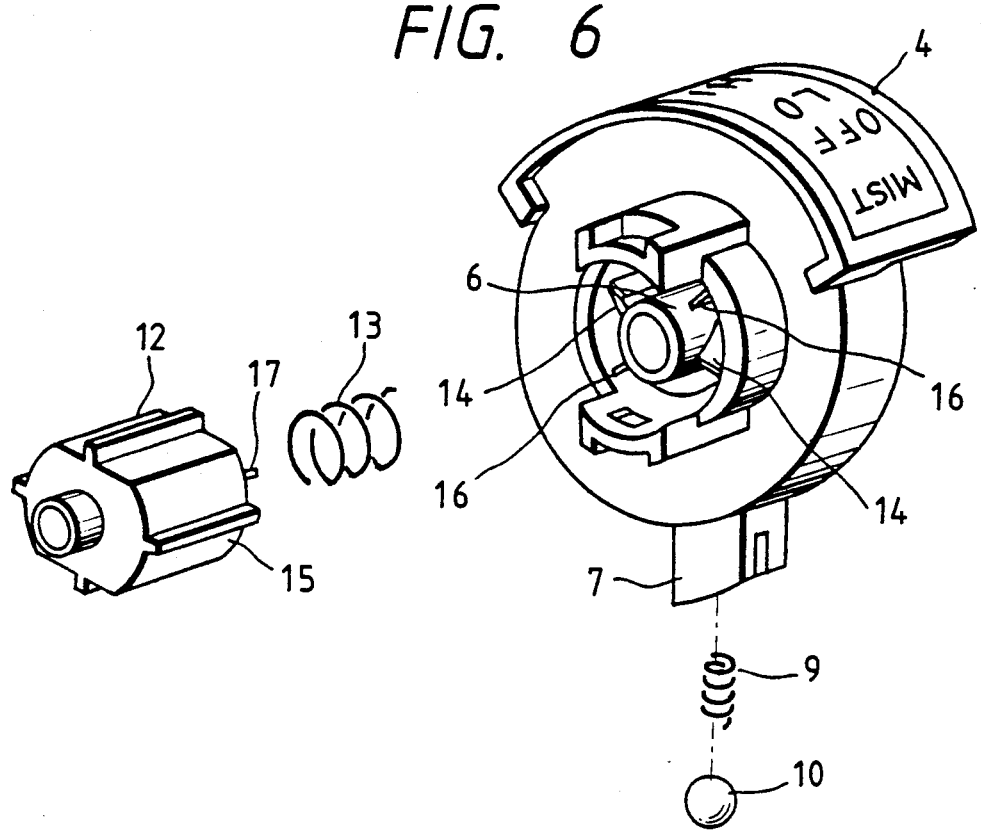
FIG. 6 is an exploded perspective view partially showing the rotor and the slider.
Figure 7:
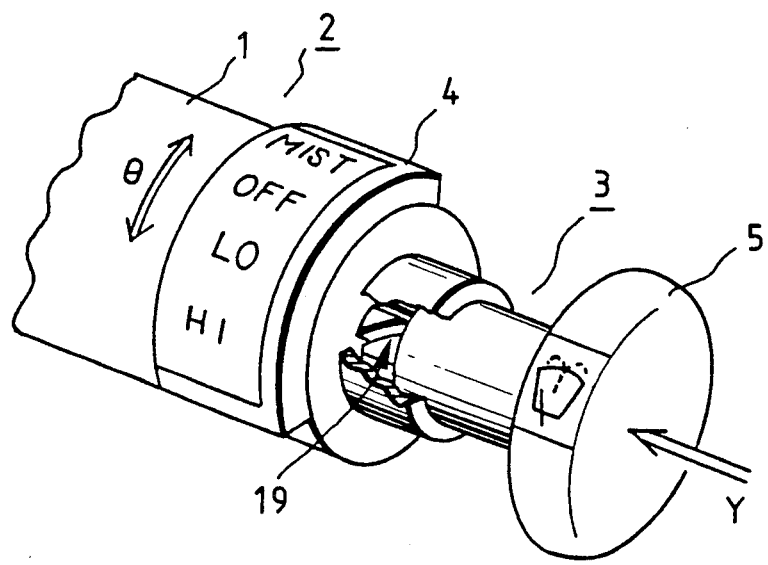
FIG. 7 is a perspective view showing a conventional windshield wiper switch.

FIG. 6 is an exploded perspective view partially showing the rotor and the slider.

As shown in FIGS. 1 to 6, when the push button 5 is pushed against the spring 13, the slider 12 shifts in the axial center direction of the operating shaft 18, causing a washer connection (not shown) of the wafer, which is fixed inside the sleeve 1, to be switched.

FIG. 1 shows the ball 10 of the rotor 6 when it is in the OFF position. A first cam 14 is disposed on the face opposite to the slider 12 of the rotor 6, and a second cam 15 is arranged on the face of the slider 12 so as to oppose the first cam 14. That is, when the ball 10 is in the OFF position, the first and second cams 14, 15 are in contact. The contacting faces of the first and second cams 14, 15 are formed as slopes, respectively. When the second cam 15 comes into opposite contact with the first cam 14 and shifts in the axial center direction, the first cam 14 rotates around the axis.

Projected stopper 16, 17 are arranged on the faces of the slider 12 and the rotor 6 so as to oppose each other. The stoppers 16, 17 are positioned apart from each other a distance proportional to the distance by which the rotor 6 shifts from the OFF position to the LO position.

Figure 2:
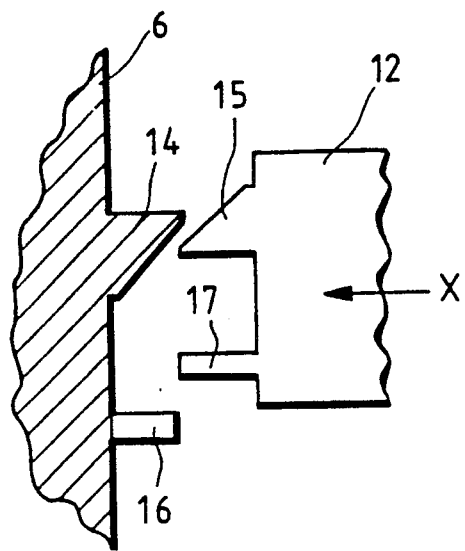
FIG. 2 explanatory view illustrating a rotor and a slider before the slider slides.
Figure 3:
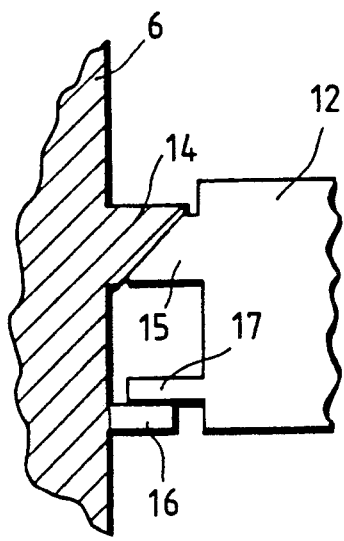
FIG. 3 is an explanatory view illustrating the rotor and the slider after the slider slides.

FIG. 2 is an explanatory view illustrating the rotor and the slider before the slider slides and FIG. 3 is an explanatory view illustrating the rotor and the slider after the slider slides.

As shown in FIGS. 2 and 3, when the push button 5 is pushed from its position shown in FIG. 2 to shift the slider 12 in the direction indicated by an arrow Y in FIG. 2, the first cam 14 comes into opposing contact with the second cam 15, causing the second cam 15 to shift in the axial center direction (in the direction indicated by an arrow X). This makes the first cam 14 rotate around its axial center. FIG. 3 shows the slider 12 after it is pushed and will not be pushed further.

Under the above conditions, the rotor 6 is constructed so as not to rotate further by its inertia from a predetermined position (in this case, the LO position), because the stoppers 16, 17 are in the state where they are in contact with each other, i.e., the stoppers 16, 17 come into contact with each other after the stopper 16 shifts upward and the stopper 17 shifts leftward.

Figure 4:
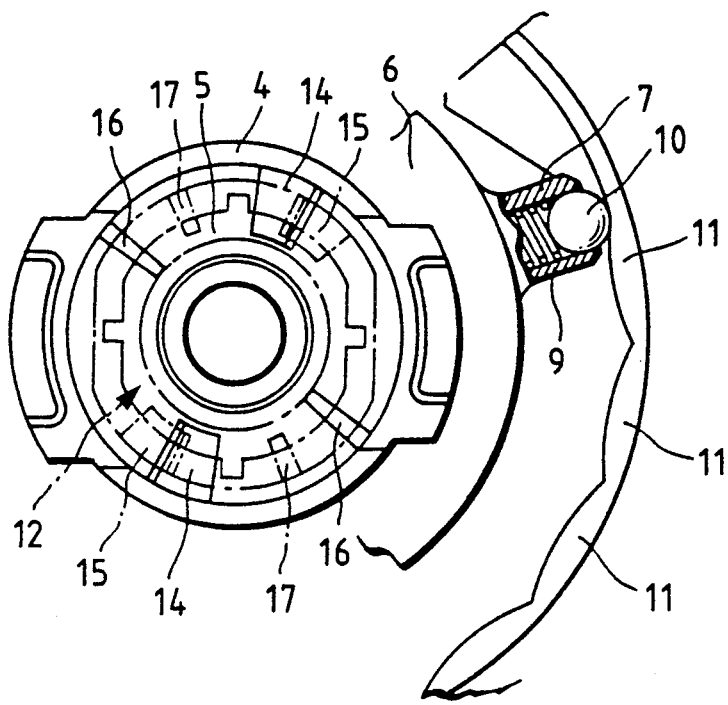
FIG. 4 is a schematic plan view showing a rotary switch and a push switch when they are in the OFF positions.
Figure 5:
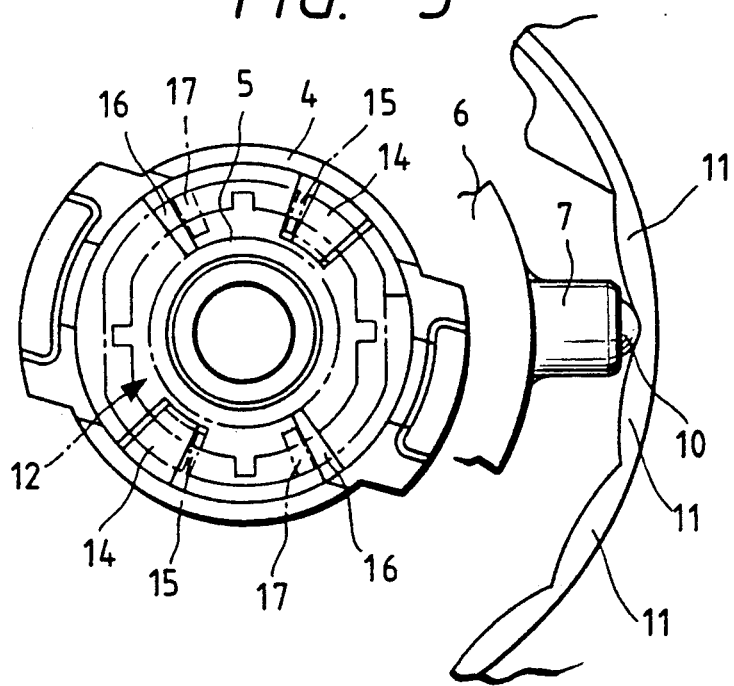
FIG. 5 is a schematic plan view showing the rotary switch and the push switch when the push switch is in the ON position from its position shown in FIG. 4.

FIG. 4 corresponds to FIG. 2 and is a schematic plan view showing the rotary switch and the push switch when the rotary switch is in the OFF position and the push switch is not pushed. FIG. 5 corresponds to FIG. 3 and is a schematic plan view showing the rotary switch and the push switch when the push switch is pushed to switch over to the LO position.

The operation of the embodiment according to the present invention will now be described with reference to FIGS. 4 and 5.

In order to operate the windshield wiper, rotate the knob 4 from the OFF position shown in FIG. 4 to any desired switch position LO, HI or MIST, indicated on the sleeve 1.

The windshield wiper is designed in such a manner that it reciprocates in a low rate while the rotary switch is in the LO position and in a high rate while the rotary switch is in the HI position. Further, the windshield wiper reciprocates only while the knob 4 is in operation, after the rotary switch is set to the MIST position, and the rotary switch returns to the OFF position once the knob 4 ceases operation. The adjusting system comprising the ball 10 and the like adjusts the various positions.

To wash the windshield with windshield washer liquid, switch the rotary switch over to the LO position before the push button 5 is pushed, then the windshield washer liquid is spouted, while the windshield wiper is operating at the same time, to wash the windshield.

If the driver pushes the push button 5 directly without first switching the rotary switch, the second cam 15 is caused by the shift of the slider 12 to shift in the axial center direction (in the left direction in FIG. 1), thereby pushing the first cam 14. This push motion makes the first cam 14 rotate clockwise as shown in FIG. 4, and the rotor 6 is thereby caused to accordingly rotate clockwise together with the rotation motion of the first cam 14. As shown in FIG. 5, the ball 10 of the rotor 6 rolls from one cam ridge 11 to another to be adjusted. Because, at this time, the stopper 16 of the rotor 6 rotates clockwise to come into contact with the stopper 17 of the slider 12 for adjusting the rotation of the rotor 6, the rotor 6 will not rotate by its inertia further from the LO position, even if the push button 5 is strongly pushed.

According to the above-described embodiment, where the push switch is first pushed without the rotary switch being switched over to the ON position, the rotary switch will be automatically switched over from the OFF position to the ON position, and the rotary switch will not rotate further from the LO position even if the push switch is pushed strongly. For these reasons, the stable and simple washer operation is obtained.

Moreover, a simply structured windshield wiper does not require a large number of components, thus leading to an advantage in terms of production cost.

As has been described, according to the present invention, it is possible to provide a windshield wiper switch which is simply constructed and which does not require a large number of components. The windshield wiper switch is so constructed that the rotary switch does not rotate further even if the push button is actuated while the rotary switch is in the OFF position, thereby preventing the switch from malfunctioning.

The invention has been described in detail with particular reference to the preferred embodiment thereof, but it will be understood that variations and modifications of the invention can be made within the spirit and scope of the invention.

What is claimed is:

1. A windshield wiper switch comprising:
a push button switch including an actuating mechanism comprising
a shaft fixedly coupled to said push button switch and
a slider coupled to and coaxially aligned with said shaft form movement with said shaft slider including a first cam portion and a first stopper;
a rotary switch coaxially aligned with said shaft and positioned to allow axial movement of said shaft through said rotary switch, said rotary switch further including a slider portion and a protruding portion for rotational movement with said rotary switch; and
a housing receiving and coaxially aligned with said shaft, said slider, and said rotary switch, said housing having a plurality of electrical conductors positioned for contact with said portion of said rotary switch, said housing further including a third cam portion positioned to contact said protruding portion of said rotary switch;
the improvement in said push button switch, said rotary switch, and said actuating mechanism comprising,
wherein said actuating mechanism further includes a first cam portion and a first stopper portion and said rotary switch further includes a second cam portion positioned for contact with said first cam and a second stopper portion positioned for contact with said first stopper portion;
wherein rotation of said rotary switch allows (a) said slider portion to contact said plurality of electrical conductors and (b) said protruding portion to contact said third cam portion;
wherein contact between said first and said second cam portions rotates said rotary switch to a predetermined position; and
wherein contact between said first stopper and said second stopper prohibits movement of said rotary switch past said predetermined position.

* * * * *